US005123769A

United States Patent [19]

Vignaud

[11] Patent Number: 5,123,769

[45] Date of Patent: Jun. 23, 1992

[54] ADJUSTABLE MOUNTING FLANGE FOR A PROXIMITY DETECTOR

[75] Inventor: Jean-Claude Vignaud, Saint Yrieix, France

[73] Assignee: Telemecanique, France

[21] Appl. No.: 608,927

[22] Filed: Nov. 5, 1990

[30] Foreign Application Priority Data

Nov. 3, 1989 [FR] France ................ 89 14413

[51] Int. Cl.[5] ................ F16B 7/04; F16L 3/08

[52] U.S. Cl. ................ 403/290; 403/362; 403/405.1; 248/74.1; 361/417

[58] Field of Search ................ 403/290, 289, 362, 361, 403/405.1, 24, 344, 388, 406.1; 248/316.5, 316.6, 71, 74.2, 74.1; 361/417, 419, 420, 427, 346

[56] References Cited

U.S. PATENT DOCUMENTS

| | | | |
|---|---|---|---|
| 2,683,206 | 7/1954 | Day et al. | 403/290 X |
| 3,080,140 | 3/1963 | Gohs et al. | 248/74.1 |
| 3,232,569 | 1/1966 | Deardorf | 248/74.1 |
| 3,757,283 | 9/1973 | Kelly | 403/290 X |
| 3,846,742 | 11/1974 | Ettinger | 403/290 X |
| 4,177,685 | 12/1979 | Delancey | 403/362 X |
| 4,479,625 | 10/1984 | Martz | 248/74.1 |
| 4,655,632 | 4/1987 | Smith | 403/362 |
| 4,795,114 | 1/1989 | Usui et al. | 248/74.1 X |

*Primary Examiner*—Peter M. Cuomo
*Attorney, Agent, or Firm*—William A. Drucker

[57] ABSTRACT

A flange is disclosed for supporting and adjusting the position of a proximity detector. The body of the flange has a cylindrical housing in which the case of the detector is held in position by clamping device. Fixing elements are provided on the side of the body to allow adjustment thereof along the axis of the housing. The body comprises a rigid web of small thickness at one end of the housing to serve as a stop for the detection face of the case.

5 Claims, 1 Drawing Sheet

ADJUSTABLE MOUNTING FLANGE FOR A PROXIMITY DETECTOR

BACKGROUND OF THE INVENTION

The present invention relates to a flange for supporting and adjusting the position of a proximity detector.

Such flanges are known and comprise a body with a cylindrical through housing, this housing receiving the case of a proximity detector. With the wall of the housing are associated screw clamping means for holding a front detection face of the case in a position which is adjustable along the axis of the housing. It is in fact necessary to adjust the case of the detector so that its front face is located at an optimum distance from the object to be detected. It should be noted that the flange body is fixed in a non adjustable position on a mounting wall of a support by screws.

The position of the case and housing is adjusted initially but, when the proximity detector needs to be removed, for example for replacement, it is necessary to adjust the position of the front face of the new case with respect to the flange.

SUMMARY OF THE INVENTION

The object of the invention is to overcome this drawback in a very simple way and without modifying the structure of the proximity detector, by means of a support and adjustment flange which makes it possible to keep the initial adjustment of the detector.

According to the invention, the means for fixing the flange body are on the mounting wall are arranged so as to allow adjustment of the body along the axis of the housing; the flange body has a rigid web of small thickness at a first end of the housing over a part at least of the periphery thereof, the web serving as stop for the detection face of the case.

The case of the proximity detector is therefore initially inserted in the housing until its detection face abuts against the web, then the clamping means are used and the axial position of the case is adjusted by axial movement of the flange body with respect to the mounting wall. Thus, by an arrangement which is easy to produce during molding of the flange body, the desired stop is obtained which memorizes the initial adjustment of the axial position of the case.

The fixing means may comprise wings with slits or oblong holes integrally molded with the flange body. The clamping means may have a flexible bearing element also integrally molded with the flange body.

BRIEF DESCRIPTION OF THE DRAWINGS

Other features and advantages of the invention will be clear from the following description of one embodiment of the invention with reference to the accompanying figures.

DESCRIPTION OF THE PREFERRED EMBODIMENTS

Figure 1:
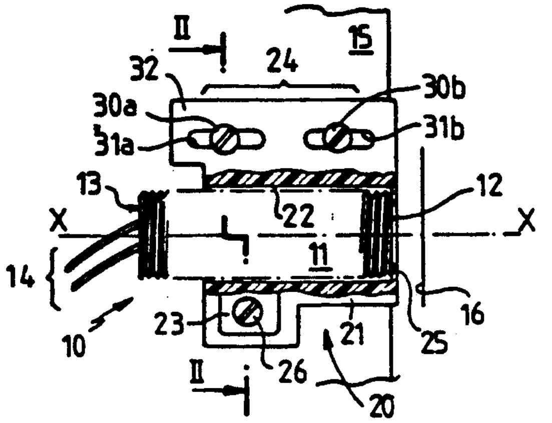
FIG. 1 shows in side elevation and in partial section a preferred embodiment of the invention.
Figure 2:
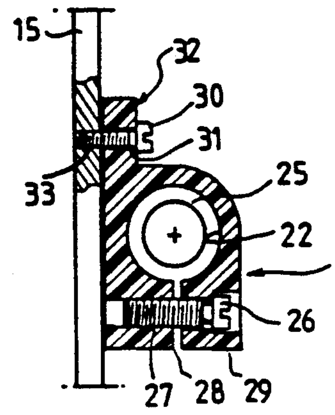
FIG. 2 is a sectional view through the plane II—II, the detector being removed.

The flange shown in FIGS. 1 and 2 serves for carrying and positioning an inductive proximity detector 10. The detector may of course be of another type.

The detector comprises a case 11 of cylindrical shape with axis X—X; the case has a front detection face 12 and a rear face 13. The cylindrical surface of the case is threaded to permit another type of mounting thereof by means of nuts on a wall perpendicular to the axis X—X. In the case are housed a detecting coil close to the detection face and an electronic processing circuit connected to external supply, control and signalling members, via conductors 13.

The proximity detector is mounted by means of flange on a flat wall 15, parallel to the axis X—X, and belonging for example to a plate or metal sheet for detecting the presence and/or the distance of a target object 16.

Flange 20 comprises a body 21 made from a molded insulating material with a cylindrical housing 22 having axis X—X; it also comprises means 23 for clamping the case in the housing and means 24 for fixing to the wall 15, these means allowing adjustment along X—X of the position of the flange with respect to the wall. The adjustment may is required take place in a direction perpendicular to the axis X—X.

The cylindrical housing 22 has, at its end situated on the same side as the detection face 12 of the case, a rigid stop web 25, about 0.2 mm thick and directed radially towards axis X—X. In the present case, the stop web extends over the periphery of the cylindrical housing and over a sufficient radial distance to ensure the rigidity thereof.

The clamping means 23, situated preferably close to the other end of the housing, comprise a screw 26 with its axis perpendicular to wall 15 and cooperating with the threaded hole 27 which is formed in a rigid wing 28 of body 21. The head of screw 26 cooperates with a flexible wing 29 of the body, so that screwing in of the screw causes the wings to draw together and therefore clamping of the case 11 of the detector in its housing.

The fixing means 24 comprise screws **30*a*, 30*b* with axis parallel to that of screw 26; screws 30 are housed in oblong holes 31 of a lateral portion or wing 32 of the body, the shape of the holes permitting movement of the flange along the axis X—X; the screws 30 cooperate with tapped orifices 33 in wall 15. The screws are unclamped during the initial adjustment operation then remain clamped after adjustment. It will be noted that the two screws 30*a*, 30*b* are situated on the same side of a plane perpendicular to wall 15 and containing the axis X—X and are associated with the same wing 32** of the flange body, which avoids rotation of the flange during adjustment.

Figure 3:
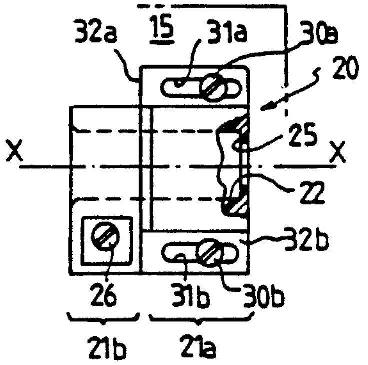
FIG. 3 is a side elevation of a variant of construction.

The variant shown in FIG. 3 comprises a flange body 21 subdivided into a rigid portion **21*a* including the stop web 25 and two fixing wings 32*a*, 32*b* each having an oblong orifice 31*a*, 31*b* and a portion 21*b* having the clamping means, in particular the rigid wing 28 and the flexible wing 29 with which screw 26** is associated.

Figure 4:
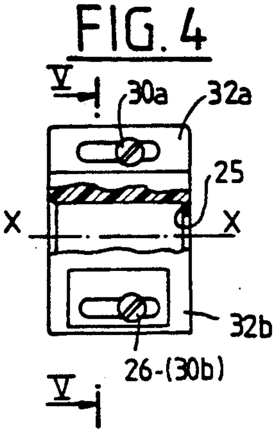
FIGS. 4 and 5 show another variant of construction in a side view and in section through V—V.
Figure 5:
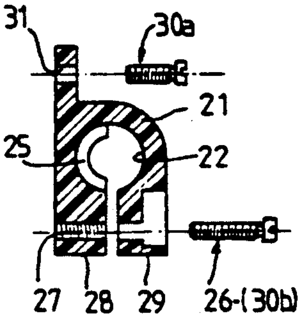

In the variant of FIGS. 4 and 5, body 21 again has two wings **32*a*, 32*b*; one of the fixing screws 30*a* serves for fixing one of the wings 32*a*to wall 15 whereas the other fixing screw 30*b* serves both for fixing the other wing 32*b*to the wall and clamping the case 11** in its housing 22. Web 25 is then provided on a portion only of the periphery of the housing.

Figure 6:
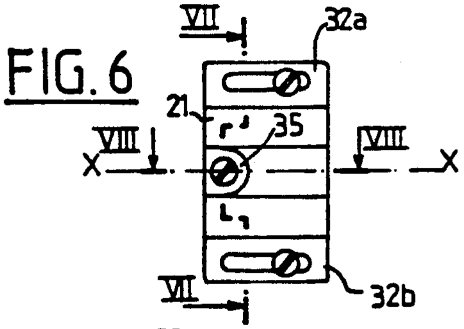
FIGS. 6 to 8 show a side view in section through VII—VII and VIII—VIII of another variant of construction.
Figure 7:
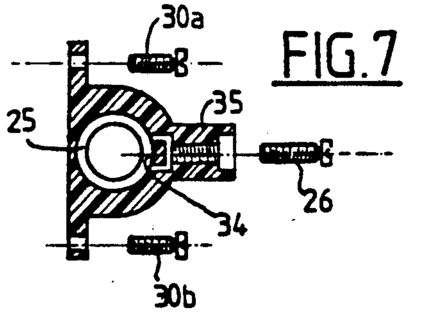
Figure 8:
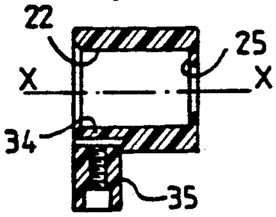

In the variant of FIGS. 6 to 8, body 21 again has two wings 32*a*, 32*b*, but clamping of case 11 in its housing is provided by a resilient tongue 34 which extends substantially parallel to the axis X—X and one end of which may be drawn close thereto by screw 26, the latter is housed in a transverse projection 35.

The flange illustrated in FIGS. 1 and 2 operates in the following way. Case 11 of the detector is introduced into housing 22 by the second end thereof until the detection face 12 of the case is stopped by web 25. Case 11 is then immobilized with respect to the flange by clamping screw 26. Then, the flange body 21 is adjusted along axis X—X to the optimum desired distance of the object 16 and is then immobilized with respect to wall 15 by tightening the screws 30.

What is claimed is:

1. The combination of a proximity detector, housed in a cylindrical case having a detection end face and a longitudinal axis of symmetry, and a flange for adjustably mounting said case on a flat supporting wall parallel to said axis of symmetry, said flange comprising: an elongate body having a cylindrical housing receiving said case and having at one end thereof a rigid web extending substantially at right angles to said axis of symmetry over at least a portion of the periphery of said body, the detection end face of said case being positioned for abutting against said web; said body having a further wing and fixing means cooperating with said further wing for adjusting the position of said body with respect to the supporting wall in the direction of said axis of symmetry; and clamping means for cooperating with said body for clamping the case in the housing.

2. The combination as claimed in claim 1, wherein the clamping means comprise a bearing element applicable on the case of the detector, the bearing element being integrally molded with the flange body and being resiliently movable with respect to the rest of the flange body.

3. The combination as claimed in claim 1, wherein the clamping means are situated close to the other end of the housing.

4. The combination as claimed in claim 1, wherein said fixing means and said clamping means comprise a common screw.

5. The combination as claimed in claim 1, wherein said fixing means comprise two screws situated on the same side of a plane perpendicular to the supporting wall and containing said axis.

* * * * *